United States Patent
Leboeuf, Sr.

(10) Patent No.: US 12,005,480 B1
(45) Date of Patent: Jun. 11, 2024

(54) ENVIRONMENTALLY SAFE ULTRA-HIGH PRESSURE SURFACE CLEANING SYSTEM

(71) Applicant: Randy Paul Leboeuf, Sr., Gray, LA (US)

(72) Inventor: Randy Paul Leboeuf, Sr., Gray, LA (US)

(73) Assignee: INNOVATIVE SURFACE PREP RENTALS, LLC, Gray, LA (US)

( * ) Notice: Subject to any disclaimer, the term of this patent is extended or adjusted under 35 U.S.C. 154(b) by 0 days.

(21) Appl. No.: 18/170,707

(22) Filed: Feb. 17, 2023

Related U.S. Application Data

(63) Continuation of application No. 16/576,713, filed on Sep. 19, 2019, now abandoned.

(60) Provisional application No. 62/733,283, filed on Sep. 19, 2018.

(51) Int. Cl.
| | |
|---|---|
| *B08B 3/02* | (2006.01) |
| *B08B 15/00* | (2006.01) |
| *C02F 1/00* | (2023.01) |
| *C02F 1/44* | (2023.01) |

(52) U.S. Cl.
CPC ............... *B08B 15/00* (2013.01); *B08B 3/02* (2013.01); *C02F 1/001* (2013.01); *C02F 1/441* (2013.01); *C02F 2301/08* (2013.01)

(58) Field of Classification Search
CPC . B08B 15/00; B08B 3/02; C02F 1/001; C02F 1/441; C02F 2301/08
See application file for complete search history.

(56) References Cited

U.S. PATENT DOCUMENTS

| | | | | |
|---|---|---|---|---|
| 6,120,614 A | * | 9/2000 | Damron | B08B 3/14 134/102.1 |
| 6,240,595 B1 | * | 6/2001 | Dupuy | B08B 9/0936 15/345 |
| 2005/0022332 A1 | * | 2/2005 | McMillen | B08B 17/00 15/320 |
| 2006/0081521 A1 | * | 4/2006 | Hjerpe | E03B 1/042 210/171 |
| 2010/0096365 A1 | * | 4/2010 | Gold | B23H 1/10 219/69.15 |
| 2012/0285893 A1 | * | 11/2012 | Moore | C02F 1/52 210/723 |

* cited by examiner

*Primary Examiner* — Erin F Bergner
(74) *Attorney, Agent, or Firm* — Ted M. Anthony

(57) ABSTRACT

A method of ultra-high pressure surface cleaning. Water is first preferably filtered and de-ionized. The de-ionized water is pressurized to about 25,000 to 60,000 psi. The ultra-high pressurized water is applied to a surface, typically using a robot. The robot includes a vacuum for collecting water and debris removed from the surface. The stream leaving the robot will be an aqueous mixture of everything removed from the surface. The mixture next passes through a vacuum filtration unit, where most solids will be removed. Next, the mixture passes through a membrane filtration unit for removal of most remaining suspended solids. If toxic heavy metals are present, the mixture will pass through a heavy metal scavenger. After the foregoing treatment steps, the mixture will have less than 29 ppm suspended solids and be substantially free of lead and other heavy metals, rendering the mixture safe for surface water discharge in most cases.

14 Claims, 11 Drawing Sheets

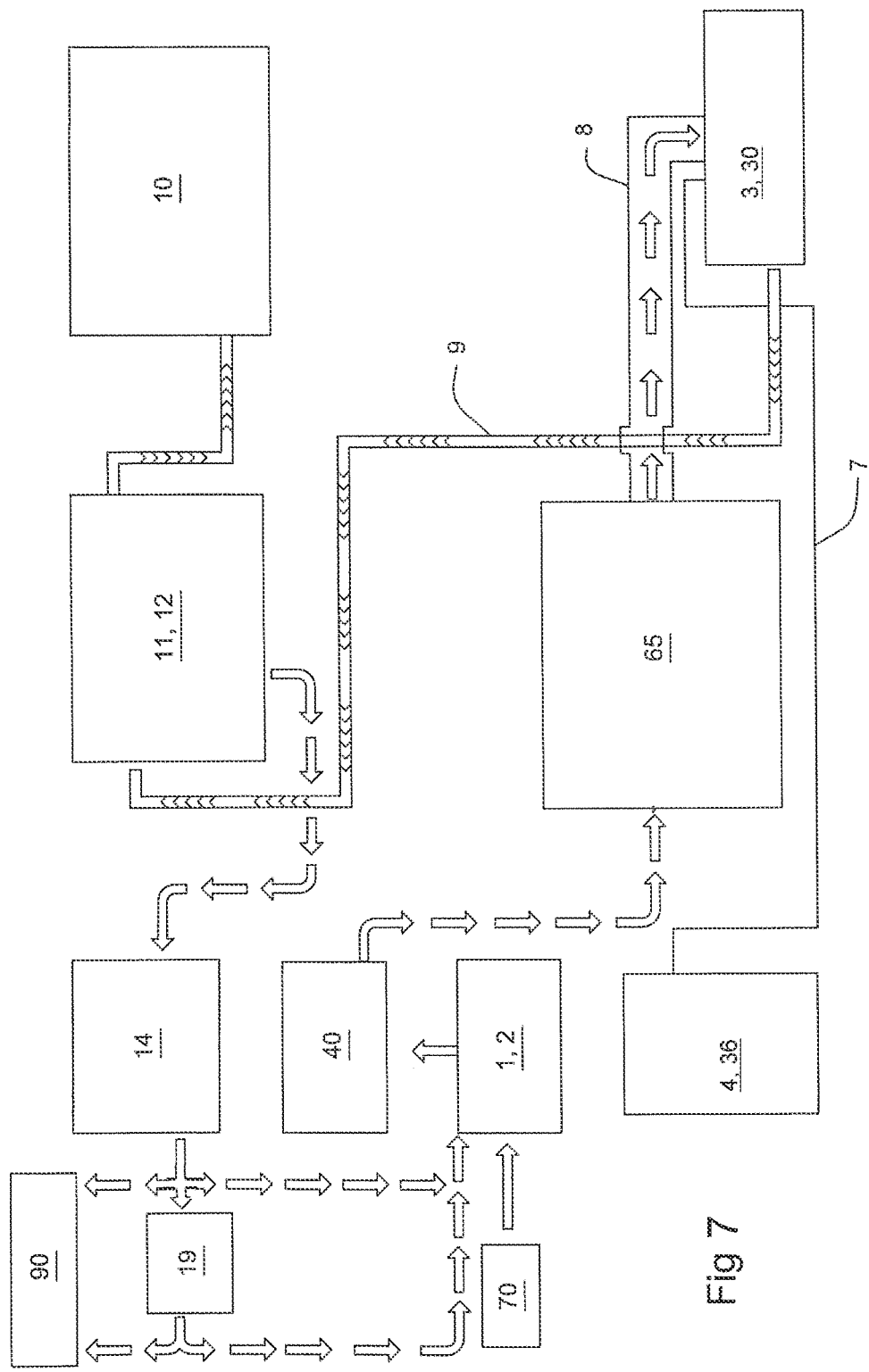

ENVIRONMENTALLY SAFE ULTRA-HIGH PRESSURE SURFACE CLEANING SYSTEM

CROSS-REFERENCE TO RELATED APPLICATIONS

This application is a continuation of pending U.S. patent application Ser. No. 16/576,713, which claimed benefit of U.S. Provisional Application 62/733,283, filed on Sep. 19, 2018, both of which are hereby incorporated by reference in their entirety.

BACKGROUND OF THE INVENTION

Field of the Invention

The invention relates to high pressure surface cleaning and preparation in general and environmentally safe surface cleaning and preparation in particular.

Prior Art

The preparation of metal surfaces with abrasives or grit has been the industry standard for decades. Sand blasting or other grit based cleaning options work well, but they require a lot of blasting material. Such approaches put media and dust particles into the air, creating a hazardous environment for workers. Prolonged exposure to airborne media can cause silicosis. It also makes a huge mess, which must be collected and disposed.

A major improvement over abrasive surface preparation is ultra-high pressure water jet cleaning. Water streams may be applied to metal and concrete surfaces at very high pressures. In common applications, water may exit the nozzle at pressures ranging from 25,000 to 60,000 p.s.i. The ultra-high pressure water will remove paint, rust, dirt, grime, corrosion inhibiting coatings, liners, and residue from the surface. The inventor utilizes a commercially available ultra-high pressure robot to prepare the surfaces being cleaned.

The robots are provided with a vacuum line connecting the robot to a vacuum source. In the preferred embodiment, a 60 hp belt driven Roots blower motor is used to power the vacuum. The robots adhere to the surface being cleaned with a vacuum attachment. Typical vacuum strengths are 17-18 inches of mercury. Vacuums of this strength secure the robot to the surface. In addition to horizontal surfaces—i.e. floors—the robots can adhere to vertical surfaces and even inverted horizontal surfaces, that is, to walls, ceilings, and bottoms. When the vacuum is securing the robot to a surface without the aid of gravity, guide wires are typically provided to support the robot in the event the vacuum is lost.

Yo-yo style retractable counterbalance supports are typically used to support the robot. These are spools that allow wire to play out or in, as long as the spools are being advanced or retracted slowly. If the spool begins to rotate too quickly, consistent with a falling robot, the spools stop turning. The cessation happens quickly, but usually not instantaneously to avoid a hard check to the robot's fall. The spools may be set so that they are effectively providing no support unless the robot falls. Alternatively, they can be set to retract with enough force so that the robot is effectively weightless. Suitable counterbalance supports may be obtained from PK Safety of Alameda, California.

An ultra-high pressure water line is secured to the robot. Typically, water is delivered to the robot at pressures ranging from 25,000 to 60,000 p.s.i. The robot directs the ultra-high pressure water stream to the surface being cleaned. The ultra-high pressure water stream removes paint, coatings, dirt, grime, corrosion, and other residue from the surface. The ultra-high pressure water can be used to meet different levels of surface cleanliness, which may vary depending upon how the surface will be coated and/or used.

The National Association of Corrosion Engineers and the Society for Protective Coatings (formerly the Steel Structures Painting Council publish joint standards on the degree of surface cleanliness to be achieved by water blasting. These range from NACE WJ-1/SSPC-SP WJ-1 through NACE WJ-4/SSPC-SP WJ-4, with WJ-1 being the most thorough level of cleanliness (removal of every trace of rust, other corrosion, coatings, and mill scale) and WJ-4 (light cleaning). The standards are well known to those skilled in the field, and they are hereby incorporated by reference in their entirety. Ultra-high pressure water jet robots are commonly utilized to achieve all four levels of cleaning, depending on the application The vacuum source collects the dispensed water and debris removed from the surface. The application of the ultra-high pressure water and the collection of the water and debris both happen at the work area of the robot. There is virtually no water or debris discharged in the vicinity of the robot. Virtually everything is collected by the vacuum system and transported to a remote, typically on-site, container for collection and disposal.

The robot is provided with an independent motor or motors. The motor(s) drive a set of steerable wheels, which advance the robot over the work surface. A remote control is provided, which may communicate with the robot via emf signals or a cable may be provided for direct communication. The motor may be electric, pneumatic, hydraulic, or any conventional power source. An appropriate line—electric, pneumatic, etc.—may be provided depending on the nature of the motor. Typically, an operator drives the robot along a desired path, controlling the pressurized water stream and vacuum as and when necessary, though fully automated robots could be utilized in appropriate circumstances.

Such robots generate a significant amount of contaminated water which must be treated and disposed. Metal surfaces treated by ultra-high pressure water streams are also subject to corrosion caused by the exposure of the bare metal surface to the water. Accordingly, an improved high pressure cleaning system meeting the following objectives is desired.

OBJECTS OF THE INVENTION

It is an object of the invention to render virtually any source of water suitable for use in ultra-high pressure water cleaning systems.

It is another object of the invention to reduce the risk of corrosion in metal surfaces cleaned with ultra-high pressure water.

It is yet another object of the invention to capture and treat the water used for ultra-high pressure cleaning.

It is a still further object of the invention to remove particulates from the water used for high pressure cleaning.

It is yet another object of the invention to remove heavy metals from the water used for high pressure cleaning.

It is still another object of the invention to render water used for ultra-high pressure cleaning safe for discharge into the surface waterways.

SUMMARY OF THE INVENTION

Prior to pressurizing water for use in ultra-high pressure cleaning, the water is de-ionized, preferably by reverse osmosis filtration. This removes salts, chlorides, and other potential corrosion agents from the water. In the current practice, tap, well, or surface water is commonly used to clean surfaces. When the water dries, it will leave a residue on the metal formed of the minerals and salts contained in the water. These contaminants will remain below any paint or coating later applied to the metal. Over time, the salts and minerals left on the metal surface can lead to corrosion of the metal. By removing contaminants from the water prior to using it for cleaning, the corrosion agents left on the metal surface after the water dries may be reduced or eliminated.

After the surface has been cleaned, the water and debris is collected via the vacuum portion of the robot. It first is directed to a dewatering vacuum tank, where the water and particulates are vacuum loaded onto a filter in the tank. The water then drains through the filter via gravity, and most of the solids are retained in the dewatering tank. After the project is complete, the entire dewatering tank may be driven to a land fill where the filter and the retained solids may be discarded together. Alternatively, the filter and its contents may be removed on site and a new filter added to the dewatering tank.

Next, the water is pumped to a membrane filtration system. Solid content in the water exiting the membrane filtration system is 4-15 parts per million (ppm). Federal regulations governing discharge of waters into surface waters as well as the seas typically require solids to be at or below 29 ppm. Accordingly, water filtered according to the present invention will meet federal solids content requirements for discharge into the environment.

Another problem with post-high pressure cleaning waste water is the tendency of the water stream to pick up heavy metals, such as lead, which may be present in the object being cleaned. By treating the water with a metal scavenger, water insoluble metal compounds may be formed, which will cause the insoluble metal compounds to fall out of solution. The resulting water stream is both well below the federal solids guidelines and substantially free of heavy metals, making the water suitable for discharge into the environment in most cases.

BRIEF DESCRIPTION OF DRAWINGS

At FIG. 1 is a perspective view of a preferred embodiment of a water jet robot.

FIG. 7 is a schematic illustration of one embodiment of the process.

DETAILED DESCRIPTION OF THE INVENTION

Figure 1:
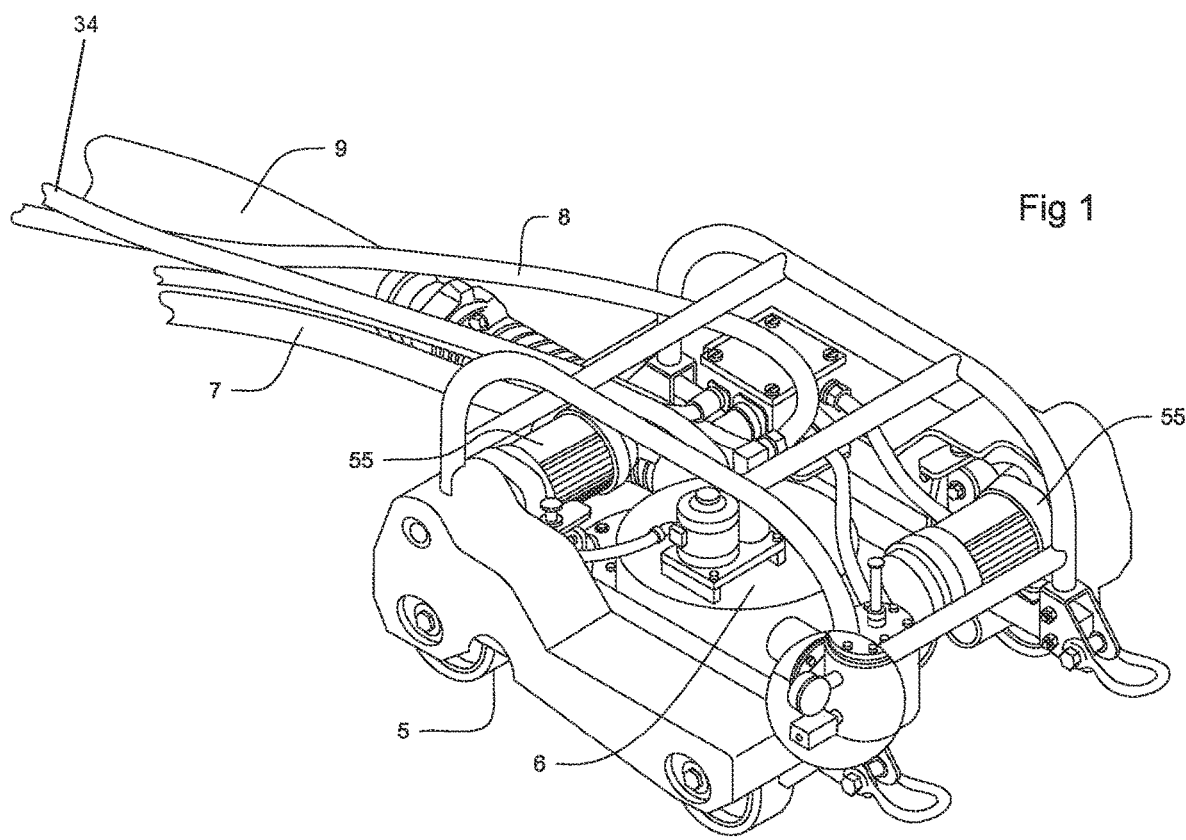
Figure 2:
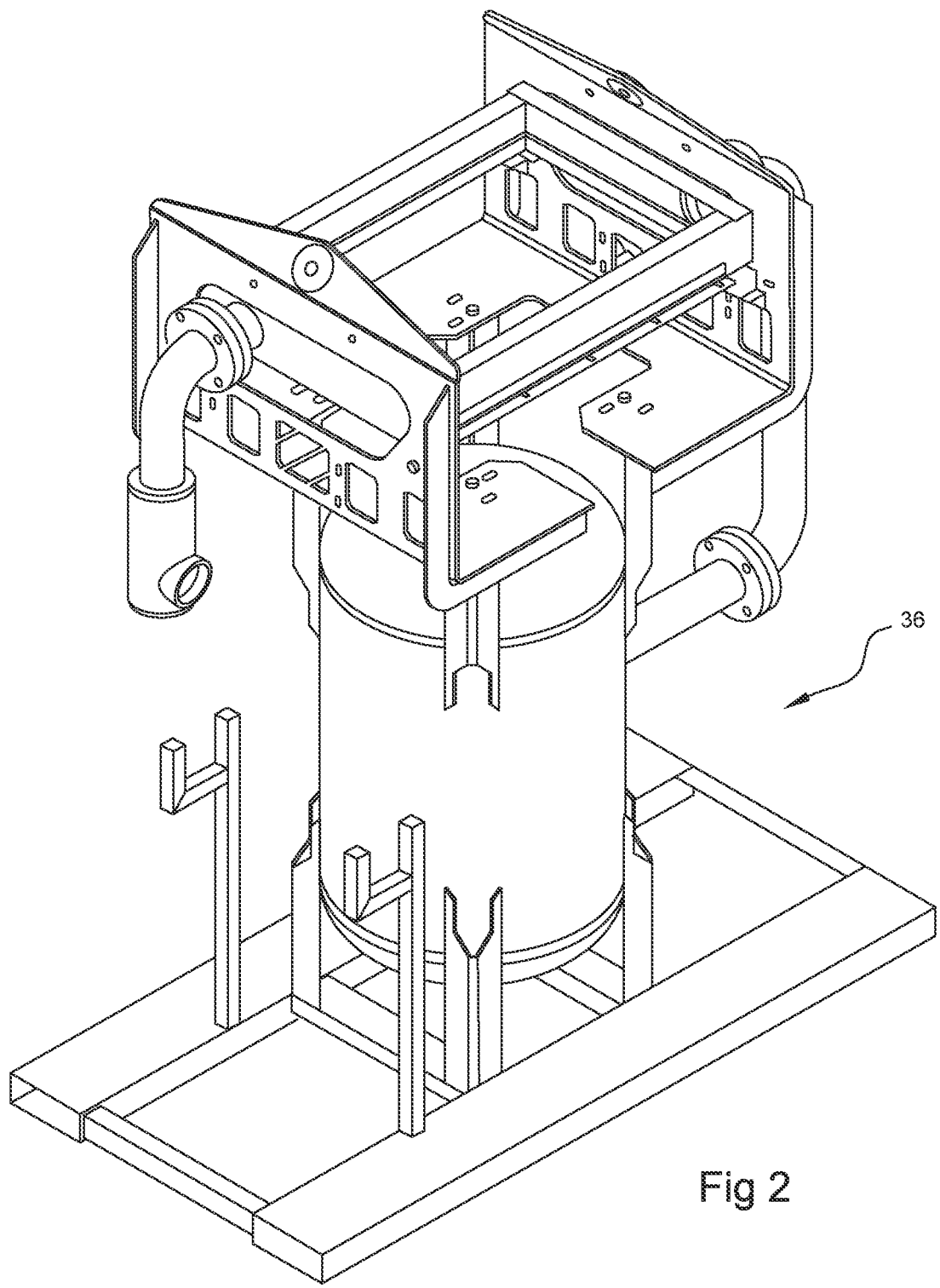
FIG. 2 is a perspective view illustrating a preferred embodiment of an air preparation unit for use with a water jet robot or hand lance.
Figure 3:
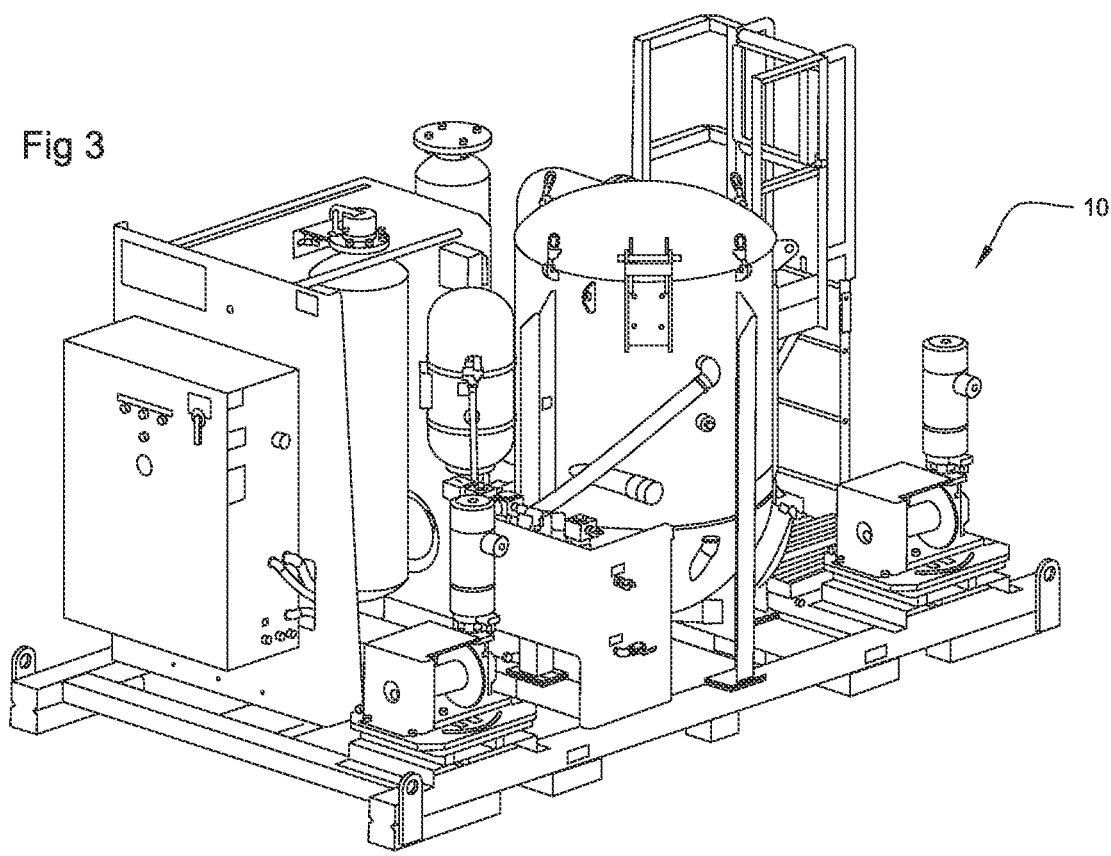
FIG. 3 is a perspective view of a preferred embodiment of a preferred vacuum source in the form of a blower motor.
Figure 4A:
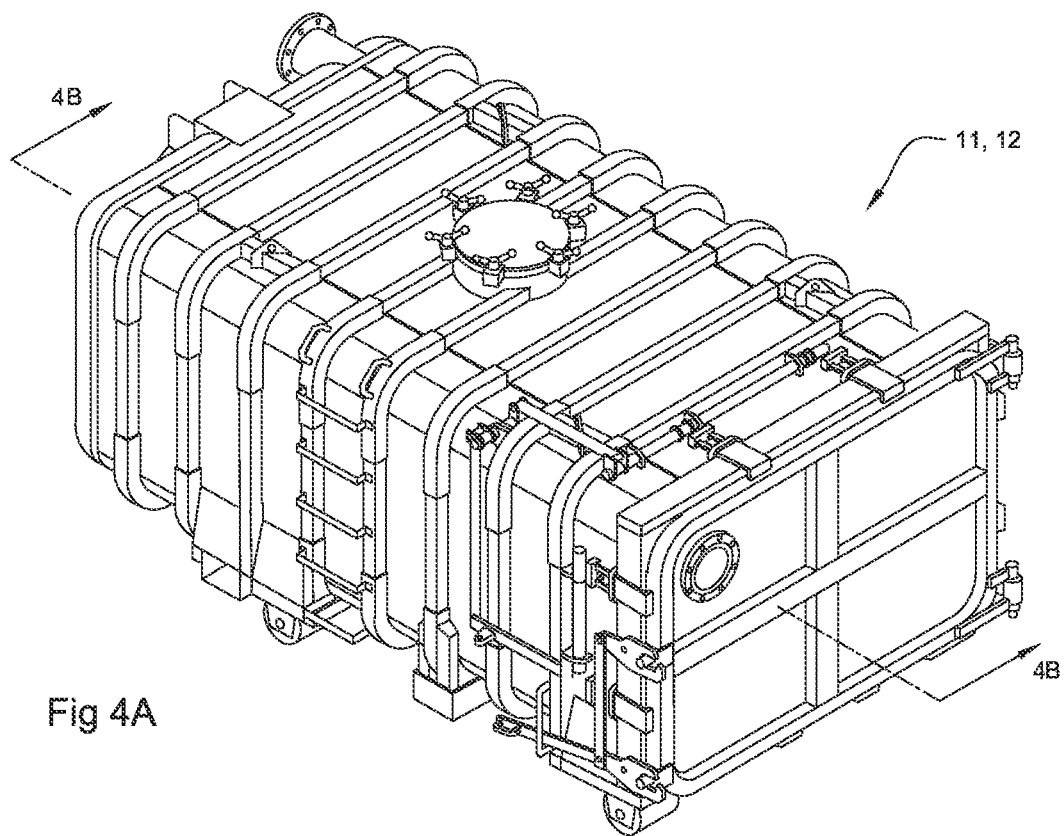
FIG. 4A is perspective view illustrating a preferred embodiment of a vacuum dewatering box.
Figure 4B:
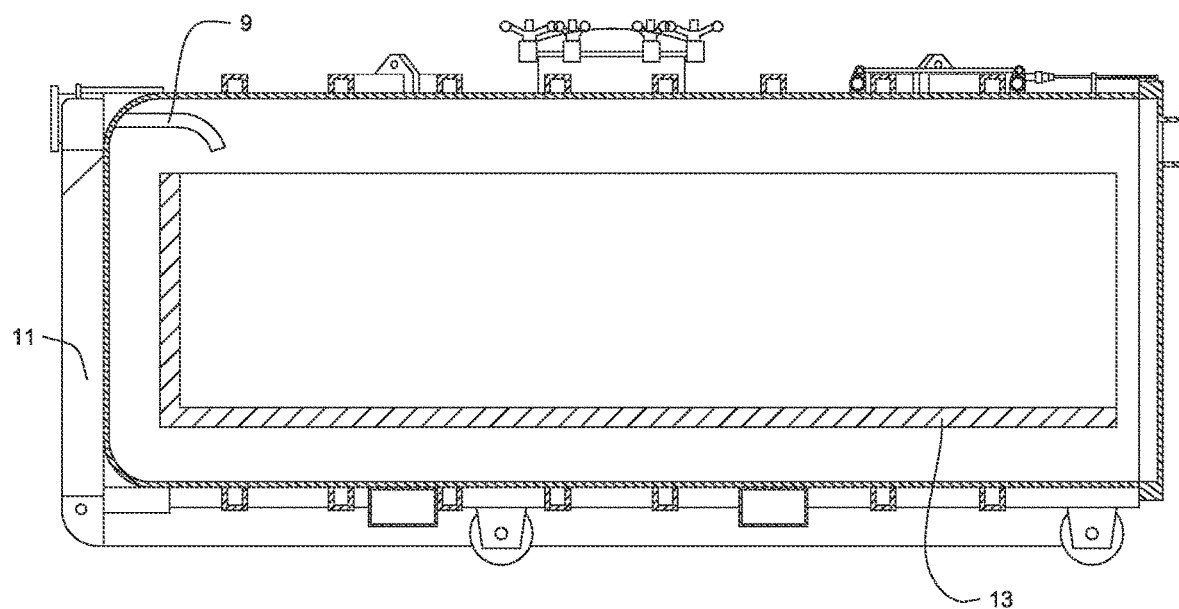
FIG. 4B is a cut-away side view of the embodiment of a vacuum dewatering box illustrated in FIG. 4A.
Figure 5A:
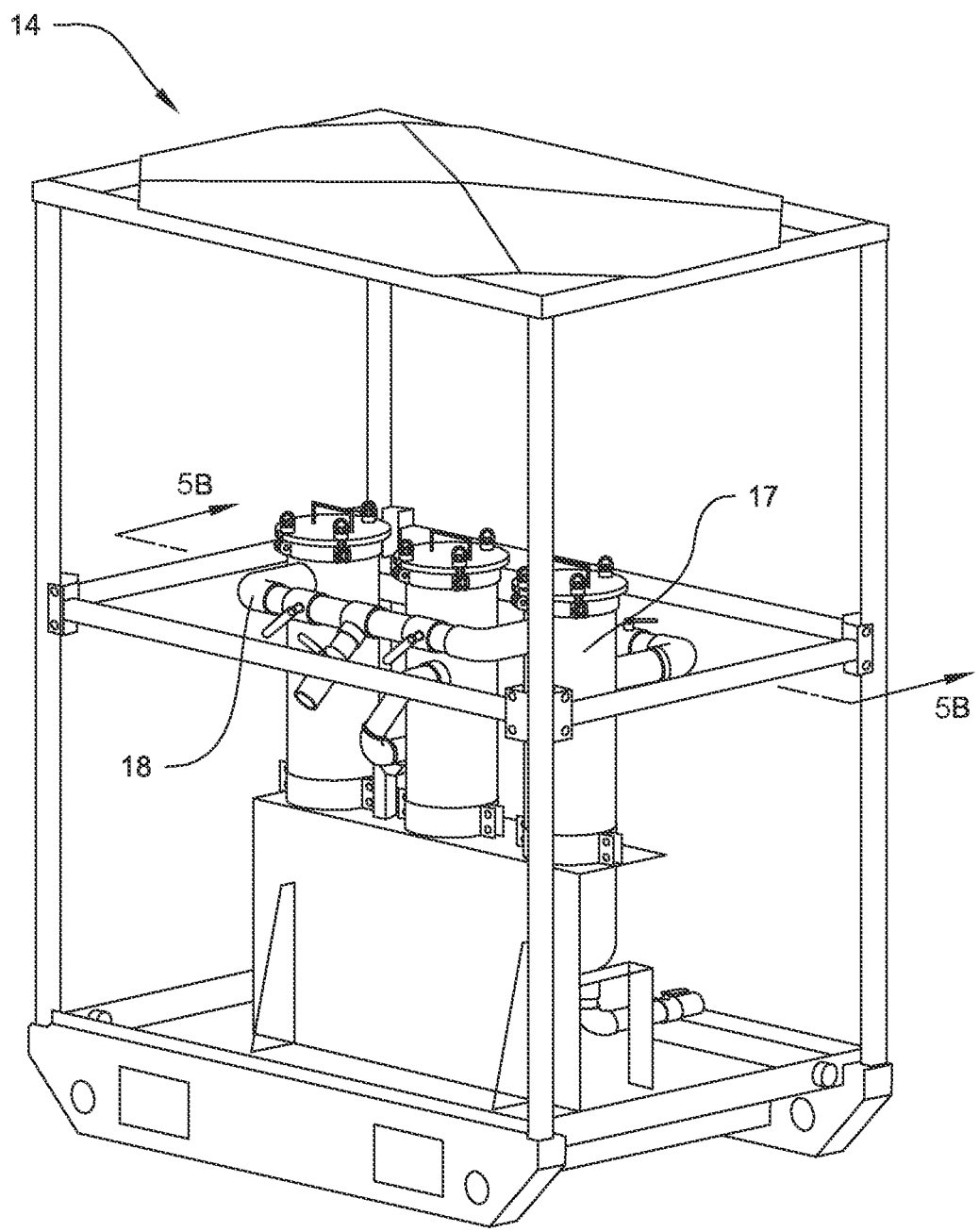
FIG. 5A is a perspective drawings illustrating a preferred embodiment of a membrane filtration unit.
Figure 5B:
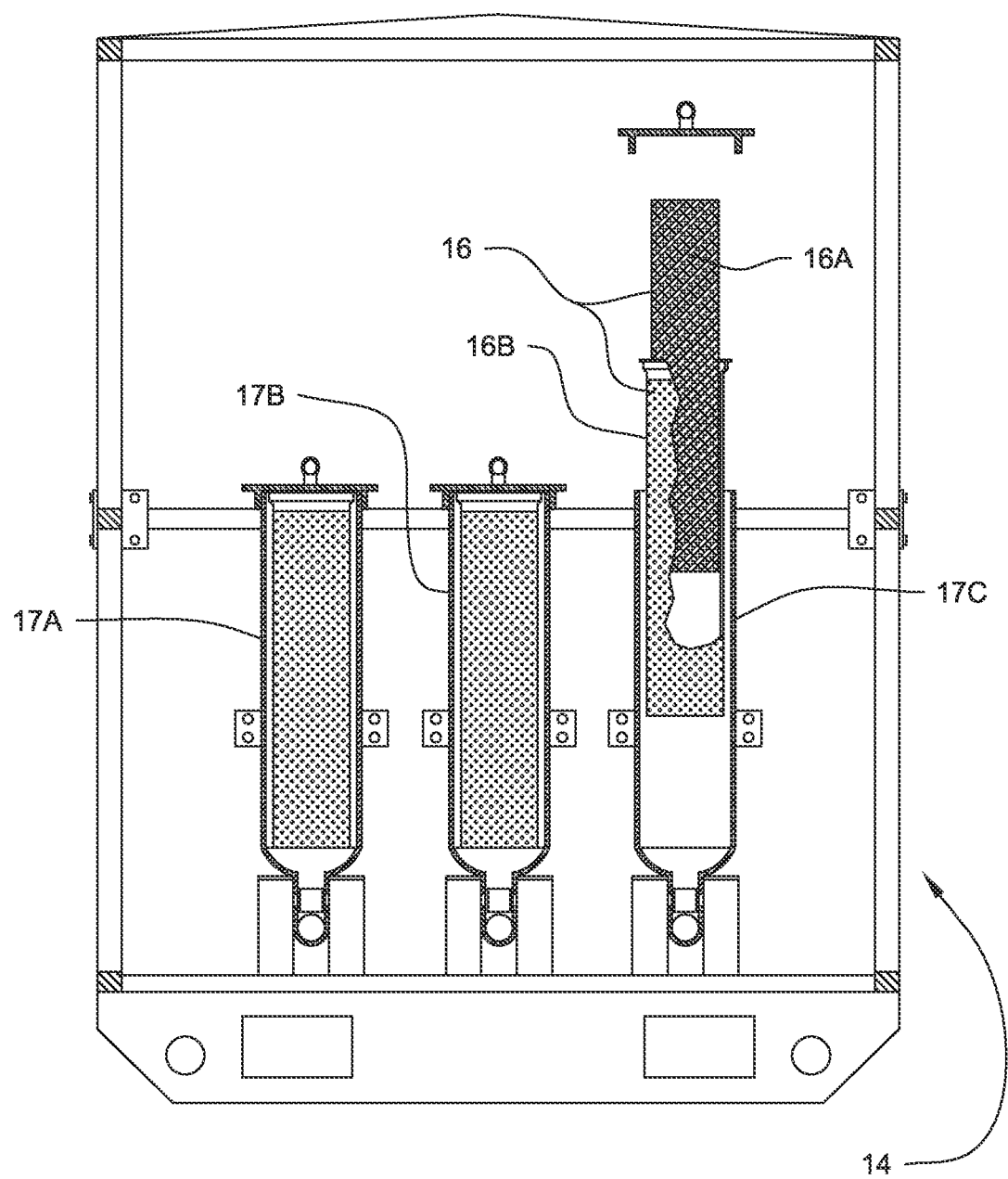
FIG. 5B is a cut-away side view of the embodiment of a membrane filtration unit illustrated in FIG. 5A.
Figure 6A:
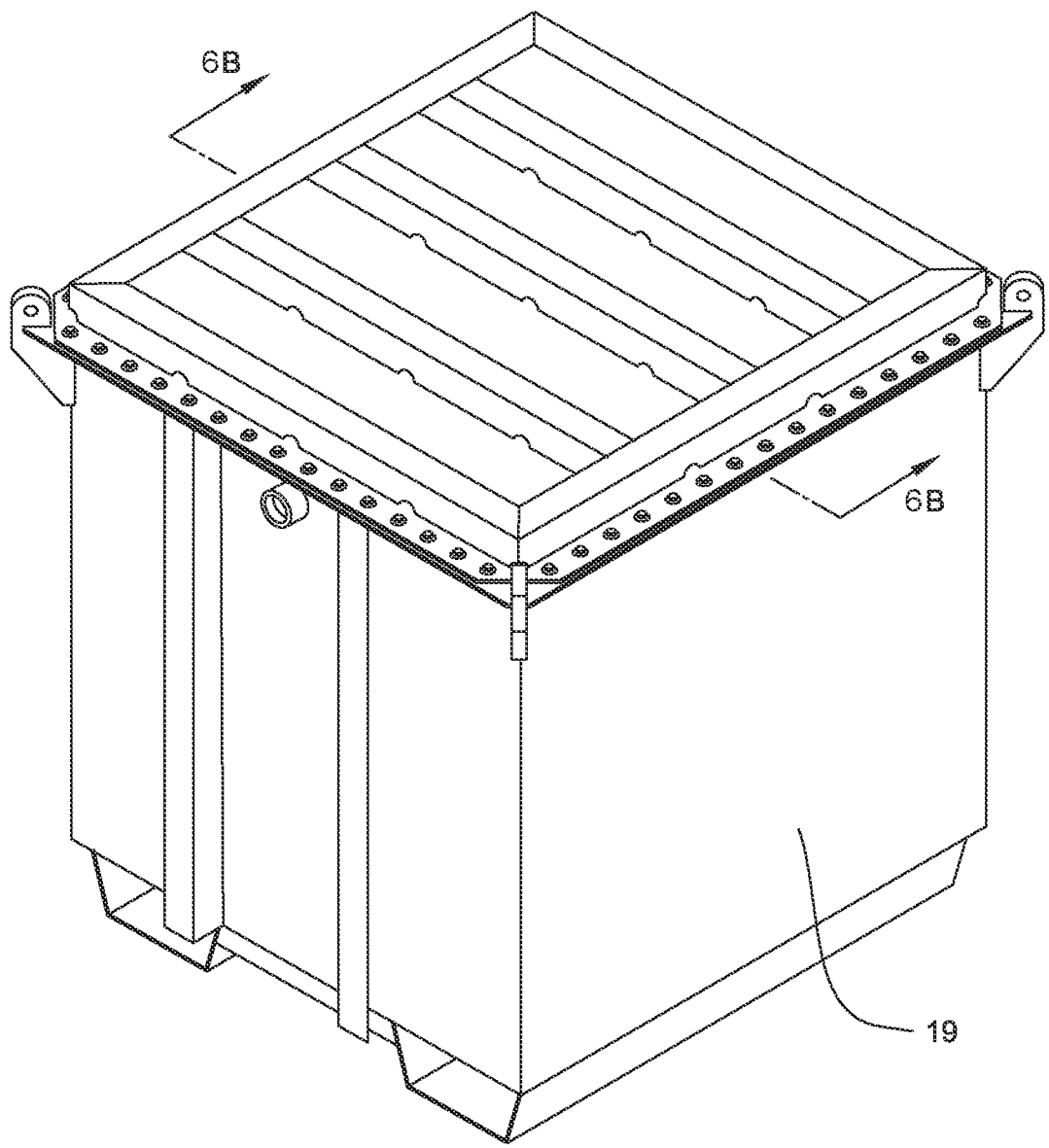
FIG. 6A is a perspective drawing illustrating a preferred embodiment of a metal scavenger unit.
Figures 6B, 6C:
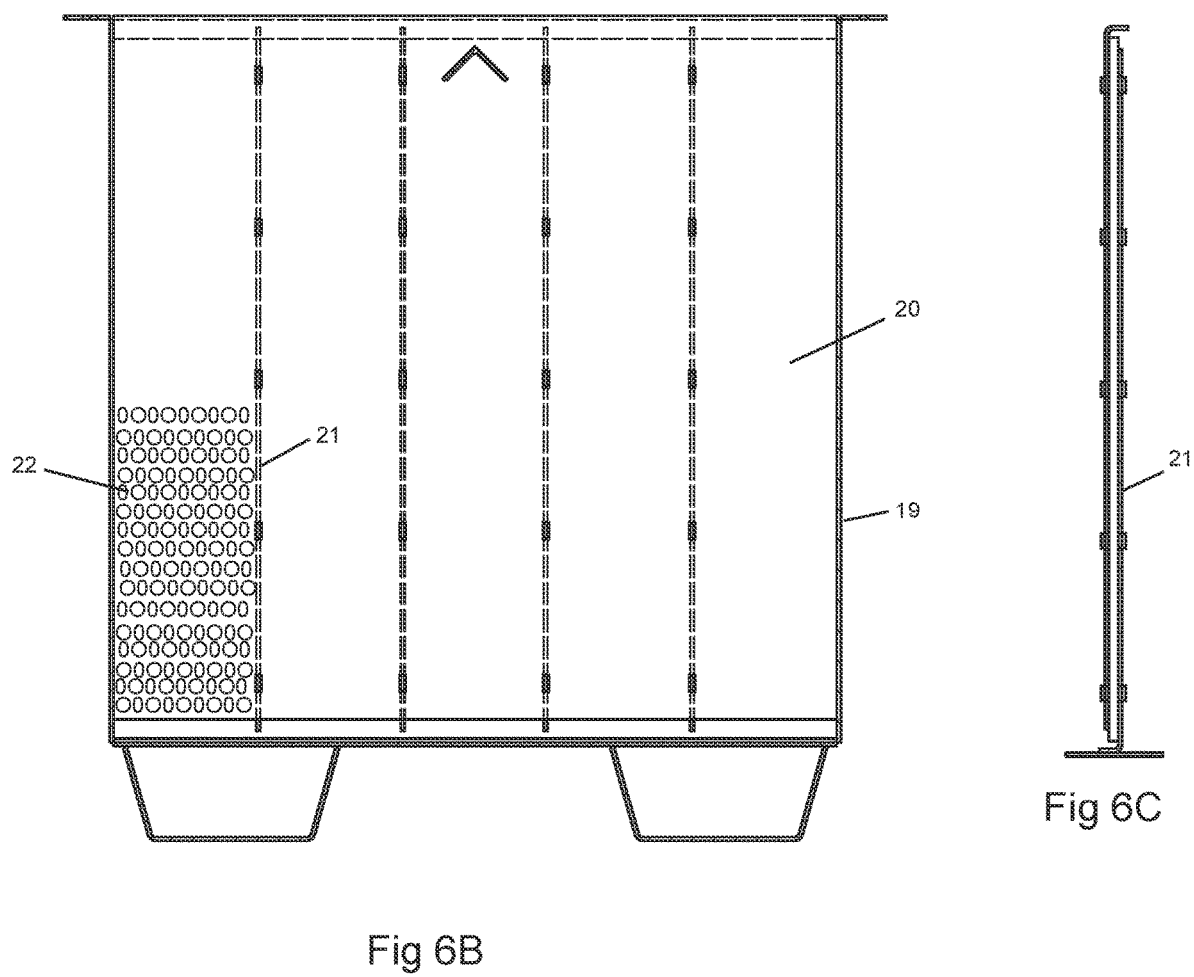
FIG. 6B is a cut-away side view of the embodiment of a metal scavenger unit illustrated in FIG. 6A.
FIG. 6C is an end view of one of the baffles in the metal scavenger unit shown in FIG. 6B.
Figure 8:
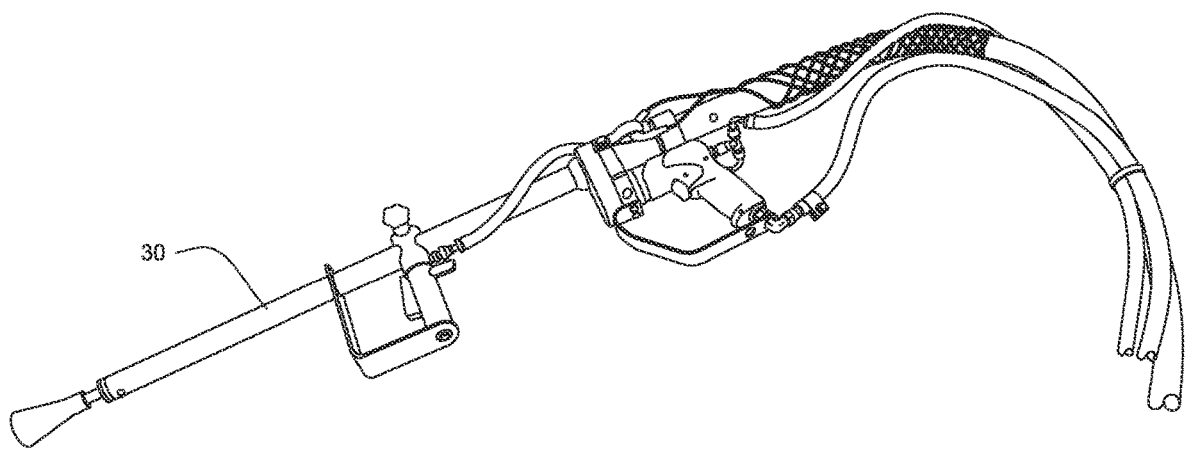
FIG. 8 is a perspective view of one embodiment of a wand for applying ultra-high pressure water to a surface to be cleaned.

A method of cleaning surfaces with ultra-high pressure water is disclosed. In the preferred embodiment, the first step is to filter the water supply 70, which may be ground water, surface water, ocean water, municipal water, or recycled water. The water is first filtered if there are any suspended solids present. An initial filtration may be especially desirable if surface waters are to be used for cleaning. After any initial filtration step, the water is passed through a primary filter to remove substantially all dissolved mineral salts, organics, chlorides and other particles. Substantially all, in this context means at most only trace amount of the aforementioned contaminants remaining. The preferred primary filtration system 1 is a reverse osmosis system 2.

Reverse osmosis is a well known means of obtaining very pure water. Salt water or ground/surface water is on one side of a semi-permeable membrane and pure water is on the other side. The membranes are commonly formed of cellulose acetate or polysulfone coated with aromatic polyamides. Water can pass through the membrane, but dissolved salts (ions), colloids, organics, and bacteria cannot. The natural osmotic process would be for water to flow from the pure side to the side with the contaminants in order to equalize the solution concentration on both sides of the membrane. However, applying pressure to the salt or ground/surface water side will cause the water to flow through the membrane in the opposite direction. That is, water will flow from the contaminated side to the pure side.

The result is a very pure, near ion-free (and thus salt free) water. Potentially corrosive contaminants such as iron and chlorides can be almost entirely eliminated. The removal of chlorine ions is especially advantageous. The filtered water can be used to clean metal surfaces and other materials susceptible to salt or mineral corrosion without leaving corrosive residue on the surface. This will increase the life of the surfaces, when they are painted or coated.

Preferred reverse osmosis filtration units 2 may be obtained from Siemens Energy, Inc. of Broussard, Louisiana. The preferred reverse osmosis units are capable of producing 300 barrels of highly filtered water per day. To achieve these rates, the preferred reverse osmosis unit requires about 20 gallons per minute of feed water. It will produce about 8.75 gallons per minute of highly filtered product water and generate about 11.25 gallons of reject water. Preferably, the substantially ion and chlorine free water is stored until needed, typically in a polyethylene tank or similar inert storage tank 40. In the preferred embodiment, once removed from storage, the ion free water is pressurized to between about 25,000 and 60,000 p.s.i. using an ultra high pressure pump 65 and streaming the ultra-high pressure (UHP) water onto the surface at rates ranging from about 5.6 gallons per minute (gpm) to about 6.5 gpm. A preferred UHP pump is a 55,000 psi direct drive tri-plex pump available from Flow Manufacturing (a division of Shape Material Removal Company) of Tomball, Texas. Flow's Husky 55K is a suitable model. The preferred vehicle for applying the UHP water is a water jet robot 3. Suitable robots 3 are available from Flow Marine Waterjet Systems (also a division of Shape Material Removal Company) of Tomball, Texas. The water jet robot scours the surface, typically leaving bare metal or concrete in its wake.

Although robot 3 is the preferred application method for applying UHP water, high pressure wands 30 are commonly used in some jobs. For example, robot 3 may not be able to reach all portions of a surface being cleaned, such as especially corners. Similarly, there may be areas that can be cleaned by either robot 3 or a worker with a wand 30, and the decision is made to use wand 30 for a variety of reasons. Frequently, such jobs will be configured so that the water and debris run by gravity to a specialty containment and collection point. Alternatively, a vacuum may be used for collection of the water and debris. Either way, once collected the wand applied water will be treated in the same fashion as the water applied by robot 3, as described in more detail below.

In one embodiment, robot 3 is provided with a pneumatic power source 4. This is a source of compressed air that drives the wheels 5 of robot 3, allowing it to move along the surface being cleaned. A suitable pneumatic power source 4 is a 375 cubic foot per minute air compressor such as those available from Cypress Equipment Rentals, Inc. of Geismar, Louisiana.

When compressed air leaves a preferred embodiment of the power source 4, it will preferably pass through an air preparation unit 36. Air preparation unit ensures that air entering the workpiece (robot 3 or wand 30) is substantially free of particulates, regulated to the appropriate pressure for the workpiece, and contains substantially less moisture than air leaving a typical compressor. In one embodiment, air will leave pneumatic power source 4 and enter air preparation unit 36 at about 125 p.s.i. The air will leave air preparation unit 36 and enter robot 3 or wand 30 at about 90 p.s.i. In addition, the moisture content of air processed by a preferred air preparation unit 36 will be reduced by about 90 percent. Suitable air preparation units may be obtained from Axiom Manufacturing Inc. of Fresno, Texas.

In another embodiment, robot 3 is provided with electric motors 55 to power wheels 5. These may be powered with standard power lines 34 leading from a power source such as a generator or an outlet to robot 3.

Robot 3 will typically have a rotating power head 6, comprised of several nozzles which discharge the ultra-high pressure water onto the surface being cleaned. The power source that drives wheels 5 may also drive the rotation of power head 6. In the embodiment shown in FIG. 1, wheels 5 are driven by electric motors 55 while power head 6 is pneumatically powered.

A UHP water supply line 8 preferably connects ultra high pressure pump 65 and robot 3. An air supply line 7 preferably connects pneumatic power source 4 to robot 3. Although electrical and pneumatic power have been described in the preferred embodiment, it will be appreciated by those of skill in the art that robot 3 and its power head 6 could be powered hydraulicly, electrically, or with any conventional power source.

A vacuum both seals robot 3 to the surface being cleaned, which allows robot 3 to climb vertical and inverted walls and ceilings, and also collects the post-cleaning stream of water and debris. A discharge line 9 leads from robot 3 to the vacuum source 10. In the preferred embodiment, vacuum source 10 is a 60 hp belt driven Roots 427 blower motor, available from Flow Marine Waterjet Systems (a division of Shape Material Removal Company) of Tomball, Texas.

Discharge line 9 empties into a dewatering box 11. This is preferably a vacuum filtration container 12. A porous filter 13 is positioned inside box 11. The preferred filter is a 60 micron micro-fiber filter. The vacuum pulls the water and solids into box 11 where they are deposited onto filter 13. Paint chips and other large solids are retained by filter 13 and water flows through filter 13 via gravity. After filtration, box 11 may be delivered to a landfill and its contents discharged there in en masse. Alternatively, filter 13 may be removed with its contents and replaced with a fresh filter 13 on site. In either case, paint chips, corrosion, and other collected solids may be disposed without cleaning personnel having to interact directly with the material being discarded.

The water that passes through filter 13 is mostly solids free. After passing through filter 13, the water is pumped out of dewatering box 11 and the collected solids are retained for disposal. Suitable dewatering boxes 11 may be obtained from the Western Oilfields Supply Co. (d/b/a Rain For Rent) at their offices in Geismar, Louisiana.

Next, the water is passed through a membrane filtration unit 14. Flow through filtration unit 14 in a preferred embodiment is driven by a double diaphragm air pump. In a preferred embodiment, the pressure should be maintained between at least 2 psi and 20 psi at a flow rate of about 100 gallons per minute. In a preferred embodiment, the water passes through two membrane filters 16. The preferred filters 16 are polyester felt bags 16A with 1 micron openings contained within a perforated metal housing 16B having a volume of about 1000 cubic inches each. A preferred embodiment of housing 16B has a mesh size of about ⅝₄th of an inch. Each membrane filter 16 is contained in a filtration canister 17.

Filtration unit 14 is set up so that the water flows into a first canister 17A. After passing through first canister 17A and its membrane filter 16, the water flows into a second canister 17B with a similar filter 16. In the preferred embodiment, a third canister 17C and filter 16 are provided. A manifold 18 is also provided that will allow the water to be introduced selectively into the first or the third canister 17A, 17C. The water will flow into second canister 17B from either first or the third canister 17A, 17C. When filter 16 in the first canister 17A becomes clogged, the water may be redirected to third canister 17C while filter 16 in first canister 17A is changed or cleaned. This allows filtration to continue without interruption.

Suitable membrane filtration canisters 17 may be obtained from the Cary Company of Addison, Illinois. Suitable filters 16 may be obtained from Pentair, plc of Minneapolis, Minnesota.

Upon exiting the membrane filtration unit 14, the water will be well below the federal suspended solids limit of 29 ppm. Solids content in the 4-15 ppm range or lower will typically be achieved.

The water stream is next treated for heavy metals, if any are present. The water stream is passed through a sulfide based metal scavenger unit 19 containing a sulfide based metal scavenger 22. The preferred scavenger unit 19 is a baffled box 20 containing a plurality of baffles 21. Baffles 21 are configured so that to pass through scavenger unit 19, fluid will enter on one side and must flow over and then under each successive baffle 21 until it exits the opposite side of box 20. In one preferred embodiment, this is accomplished by providing baffles 21 with a vertical passage so that fluid must pass the vertical length of each baffle 21 in order to move across each baffle 21. The metal scavenger is positioned with box 20, filling or partially filling the spaces between baffles 21. The configuration of the baffles ensure that fluid passing through scavenger unit 19 will come into thorough contact with the scavenger.

The preferred scavenger is comprised of calcium polysulfide, a widely available industrial chemical. Metal ions in the water, such as cadmium, lead, mercury and arsenic (collectively "heavy metals") will preferentially react with the sulfide, forming a water insoluble metal sulfide. The metal sulfide will precipitate out of solution. Having passed through scavenger unit 19, the resulting water stream will be substantially free of heavy metals and well within the required solids limits. Substantially free, in this context means less than the amount necessary to comply with the U.S. Environmental Protection Agency's relevant effluent guideline issued under title III of the Clean Water Act, 33 U.S.C. § 1251.

The water stream may be discharged into the waterways or diverted to reverse osmosis filtration unit 2 and reused for ultra-high pressure cleaning. If the water is too hot for reuse or discharge, it may be retained in a storage tank or run through a chiller (not shown) and allowed to cool or be cooled to the desired temperature. Discharge 90 into the surface waters or the seas will be the typical end point for the treated water stream where access to additional water for ultra-high pressure cleaning is not an issue. However, where conservation of the water used for cleaning is a priority, such as where the water source is under drought restrictions, for example, the ability to recycle the treated water for re-use in ultra-high pressure cleaning robot 3 may be particularly advantageous.

These and other improvements to ultra-high pressure water cleaning systems will be apparent to those of skill in the art from the foregoing disclosure and drawings and are intended to be encompassed by the scope and spirit of the following claims.

The invention claimed is:

1. A method of cleaning a surface to at least a WJ-2 level of cleanliness comprising:
   de-ionizing water
   pressurizing said water to at least about 25,000 psi;
   applying said pressurized, de-ionized water to said surface to remove foreign substances from said surface until at least a WJ-2 level of cleanliness is obtained;
   collecting a mixture of said water and said foreign substances from said surface via vacuum;
   transporting said mixture of said water and said foreign substances to a first filtration unit;
   removing a portion of said foreign substances from said mixture in said first filtration unit;
   transporting said mixture to a second filtration unit; and
   removing a second portion of said foreign substances from said mixture in said second filtration unit.

2. A method of cleaning a surface to at least a WJ-2 level of cleanliness according to claim 1 further comprising passing said mixture through a heavy metal scavenger, whereby substantially all heavy metal ions present in the mixture are removed.

3. A method of cleaning a surface to at least a WJ-2 level of cleanliness according to claim 1 wherein said water is pressurized to between about 25,000 and 60,000 psi.

4. A method of cleaning a surface to at least a WJ-2 level of cleanliness according to claim 3 wherein said water is applied at a rate of between about 5.6 and 6.5 gallons per minute.

5. A method of cleaning a surface to at least a WJ-2 level of cleanliness according to claim 1 wherein said first filtration unit comprises a dewatering vacuum container box.

6. A method of cleaning a surface to at least a WJ-2 level of cleanliness according to claim 5 where said first filtration unit further includes a filter.

7. A method of cleaning a surface to at least a WJ-2 level of cleanliness according to claim 6 wherein said filter is configured to allow disposal of the filter and its contents without directly handling the contents.

8. A method of cleaning a surface to at least a WJ-2 level of cleanliness according to claim 1 wherein said second filtration unit comprises a membrane filtration unit.

9. A method of cleaning a surface to at least a WJ-2 level of cleanliness according to claim 8 wherein said second filtration unit comprises at least two membrane filtration units provided in sequence.

10. A method of cleaning a surface to at least a WJ-2 level of cleanliness according to claim 8 wherein said mixture includes some suspended solids.

11. A method of cleaning a surface to at least a WJ-2 level of cleanliness according to claim 10 wherein said suspended solids comprise less than 29 parts per million of said mixture after exiting said second filtration unit.

12. A method of cleaning a surface to at least a WJ-2 level of cleanliness according to claim 11 wherein said suspended solids comprise between about 4 and 15 parts per million of said mixture after exiting said second filtration unit.

13. A method of cleaning a surface to at least a WJ-2 level of cleanliness according to claim 2 wherein said heavy metal scavenger further comprises calcium polysulfide.

14. A method of cleaning a surface to at least a WJ-2 level of cleanliness according to claim 1 where said deionization of said water leaves said water substantially free of salts and chlorides.

* * * * *